US012422956B2

(12) United States Patent
Seiler

(10) Patent No.: US 12,422,956 B2
(45) Date of Patent: Sep. 23, 2025

(54) TOUCHLESS USER-INTERFACE CONTROL METHOD INCLUDING TIME-CONTROLLED FADING

(71) Applicant: Ameria AG, Heidelberg (DE)

(72) Inventor: Martin Seiler, Ehrenkirchen (DE)

(73) Assignee: Ameria AG, Heidelberg (DE)

( * ) Notice: Subject to any disclaimer, the term of this patent is extended or adjusted under 35 U.S.C. 154(b) by 0 days.

(21) Appl. No.: 19/110,491

(22) PCT Filed: Sep. 14, 2023

(86) PCT No.: PCT/EP2023/075337
§ 371 (c)(1),
(2) Date: Mar. 11, 2025

(87) PCT Pub. No.: WO2024/061744
PCT Pub. Date: Mar. 28, 2024

(65) Prior Publication Data
US 2025/0258570 A1    Aug. 14, 2025

(30) Foreign Application Priority Data
Sep. 19, 2022    (EP) .................................... 22196434

(51) Int. Cl.
*G06F 3/042*    (2006.01)
(52) U.S. Cl.
CPC .. *G06F 3/0428* (2013.01); *G06F 2203/04101* (2013.01)
(58) Field of Classification Search
CPC .................................................... G06F 3/0428
See application file for complete search history.

(56) References Cited

U.S. PATENT DOCUMENTS 11,182,068 B2 *  11/2021  Bargmann .......... G06F 3/04842
11,275,498 B2 *   3/2022  Nagano ................ G06F 3/0354
(Continued)

FOREIGN PATENT DOCUMENTS

EP    3182250 A1    6/2017

OTHER PUBLICATIONS

International Search Report and Written Opinion issued in App. No. PCT/EP2023/075337, dated Dec. 5, 2023, 8 pages.
(Continued)

*Primary Examiner* — Chun-Nan Lin
(74) *Attorney, Agent, or Firm* — Blueshift IP; Robert Plotkin

(57) ABSTRACT

A computer-implemented touchless user-interface control method for an electronic display, comprising: defining a first spatial input area associated with a first depth camera for the recognition of touchless input, the first spatial input area having a first spatial boundary; defining a second spatial input area associated with a second depth camera for the recognition of touchless input, the second spatial input area having a second spatial boundary; detecting, using the first and the second depth camera, an input object and determining a set of 3D-points corresponding to the input object; wherein the set of 3D-points includes a first subset of 3D-points which is based on data captured by the first depth camera, and a second subset of 3D-points which is based on data captured by the second depth camera; determining a touchless control pointer based on the positions of the 3D-points; performing time-controlled fading wherein one or both of the subsets of 3D-points is faded out or faded in within a period of time depending on successive positions of the touchless control pointer relative to the first and second spatial boundaries.

14 Claims, 19 Drawing Sheets

(56) References Cited

U.S. PATENT DOCUMENTS

| | | | | |
|---|---|---|---|---|
| 2010/0280988 A1* | 11/2010 | Underkoffler | ........ | G06V 40/107 |
| | | | | 706/58 |
| 2010/0281440 A1* | 11/2010 | Underkoffler | .......... | G06V 10/96 |
| | | | | 715/863 |
| 2014/0292723 A1* | 10/2014 | Suzuki | .................. | G06F 3/0425 |
| | | | | 345/175 |
| 2017/0192617 A1* | 7/2017 | Barth | .................... | G06F 3/0425 |
| 2019/0114801 A1* | 4/2019 | Shimaoka | ................. | G06T 7/80 |

OTHER PUBLICATIONS

Extended European Search Report issued in App. No. EP22196434, dated Mar. 23, 2023, 9 pages.

\* cited by examiner

TOUCHLESS USER-INTERFACE CONTROL METHOD INCLUDING TIME-CONTROLLED FADING

TECHNICAL FIELD

The present invention generally relates to controlling a touchless user-interface, and more particularly to a touchless user-interface control method for an electronic display. Further, the present invention relates to a use of one or more depth cameras in a touchless user-interface control method, and to a data processing apparatus for carrying out a touchless user-interface control method.

BACKGROUND

Electronic displays have nowadays become omnipresent in various areas of modern life. Examples include electronic display screens or electronic display projectors in public places which provide useful information to the user, e. g. in shopping malls, trade shows, train stations, airports, and the like, a field which is commonly termed "digital signage". One form of such electronic displays are touchscreens that provide a user-interface including interactive functions to allow users to interact with the information, e. g. by selecting control elements such as buttons, selecting items from a list, controlling a cursor, and the like. Such public touchscreens are nowadays used e. g. in ticketing machines, check-out systems in supermarkets or restaurants, interactive signposts, and the like.

However, not least because of the recent COVID-19 pandemic, users have become hesitant to use touchscreens in public places because of health concerns. This has created a desire to provide input capabilities, in particular gesture control, without having to physically touch the display. Some commercial products have already addressed this desire, for example:

The touchless air gesture technology of aims at transforming touchscreens or digital displays into a touch-free experience. The Gestoos technology uses a depth sensor to allow the user to control the mouse cursor of the operating system, mapping the finger coordinates to its screen position, while the fingers stay at a distance from the screen.

GLAMOS sets out to use lidar technology to turn screens into interactive touch screens.

AIRxTOUCH provides an all-in-one touchless interactive kiosk. Depth sensors detect the user's finger before it touches the display and generates click events. The related international patent application WO 2015/139969 provides technological background.

Touchjet aims at turning flat screen

TVs into a tablet for collaboration and interactive presentations using a digital pen.

Ultraleap provides leap motion, which is a small device (infrared camera) with relatively small range for hand tracking and hand gesture recognition. The system uses a single camera, so that the hand recognition precision is limited and decreases the bigger the screen is.

The known technologies provide the control of a touchless user-interface based on detecting an input object, e. g. an input device of a hand. However, the existing solutions on the market are improvable with regard to the smooth and stable user experience, e. g. for reliably detecting touchless control input and providing comprehensible feedback for the user.

It is therefore the technical problem underlying the present invention to provide an improved touchless user-interface control method for an electronic display, thereby at least partly increasing the usability compared to known solutions of the prior art.

SUMMARY

The problem is solved by the subject-matter defined in the independent claims. Advantageous modifications of embodiments of the invention are defined in the dependent claims as well as in the description and the figures.

According to a first aspect of the present invention, computer-implemented touchless user-interface control method for an electronic display is provided. The method may comprise defining a first spatial input area associated with a first depth camera for the recognition of touchless input. The first spatial input area may have a first spatial boundary. The method may comprise defining a second spatial input area associated with a second depth camera for the recognition of touchless input. The second spatial input area may have a second spatial boundary. The method may comprise detecting, in particular using the first and the second depth camera, an input object and determining a set of 3D-points corresponding to the input object. The set of 3D-points may include a first subset of 3D-points which is based on data captured by the first depth camera, and a second subset of 3D-points which is based on data captured by the second depth camera. The method may comprise determining a touchless control pointer based on the positions of the 3D-points. The method may comprise performing time-controlled fading wherein one or both of the subsets of 3D-points is faded out or faded in. The fading in or fading out may be performed within a period of time depending on successive positions of the touchless control pointer relative to the first and second spatial boundaries.

Touchless user-interface control may include any type of interaction of a user with a user-interface without the user being required to make physical contact. In particular, touchless input to an electronic display is included. Examples for touchless inputs are movements of a cursor which is displayed to the user via the electronic display, click operations or gestures.

For touchless user-interface control, in particular for touchless input, an input object may be used. The term input object includes any kind of suitable input object such as a hand or a finger of a user, a dedicated input device which may for example be a pen or a spherical device.

The term electronic display may include all types of suitable systems for providing a visual user-interface to a user, for example electronic display screens or electronic display projectors. In particular, the term electronic display screen may include any type of display that is directly powered by electrical energy. In particular, it includes all types of LCD screens, LED screens, touch screens, e-ink screens and the like. The size and shape of the screens may vary.

It may be provided that the electronic display defines an input area. The term input area refers in general to the display layer of the electronic display on which content may be displayed during an interaction of a user and with which a user may interact. The input area may be observed at least partially by the depth cameras to recognize touchless inputs of users. For example, the input area may include or be equal to a virtual click layer which is defined to extend distanced by a predetermined distance essentially parallel to the electronic display and which is configured to recognize click inputs or gesture inputs depending on whether an input object penetrates the virtual click layer.

The first and the second depth camera may be placed opposing each other. For example, the first depth camera may be placed at or near an upper edge of the electronic display while the second depth camera may be placed at or near a lower edge of the electronic display, wherein the depth cameras face each other. For example, if the electronic display screen comprises a framing, the first and the second depth camera may be mounted at this framing. The depth cameras may for example be stereovision infrared depth cameras. One specific example for such a depth camera is the Intel RealSense depth camera. In other words, the two depth cameras may be arranged at opposing borders of the electronic display, for example one being mounted at an upper border and one being mounted at a lower border of the electronic display such that both of the depth cameras are able to observe an area which is e. g. parallel to the display layer.

Detecting the input object through the depth cameras may be performed as described in the following: The first depth camera detects the input object from its perspective, i.e. direction of view. The second depth camera also detects the input object from its perspective, i.e. direction of view. Image data captured by the first depth camera and image data captured by the second depth camera are thereby obtained. The image data of the first depth camera comprise a point cloud or are transformed into a point cloud. This is the first subset of 3D-points. Accordingly, the image data of the second depth camera comprise a point cloud or are transformed into a point cloud. This is the second subset of 3D-points. In other words, the first subset of 3D-points may be associated with the first depth camera, and the second subset of 3D-points may be associated with the second depth camera. The 3D-points may be virtual 3D-points not being displayed to a user, but only being used for performing the touchless user-interface control method.

The 3D-points of the first subset of 3D-points and the second subset of 3D-points correspond to the input object, but however they may be partly identical points of the input object, or different points of the input object. This depends on whether sections of the input object are detected by only one depth camera or by both depth cameras. In other words, if both depth camera detect a respective section of the input object, 3D-points of the first subset of 3D-points and 3D-points of the second subset of 3D-points may be defined to be in the same 3D-position, i.e. overlapping. The first and the second subset of 3D-points may be combined in one set of 3D-points to represent the input object at a higher resolution than if it were only represented by one subset of 3D-points. Thus, the position of the input objects can be determined precisely. In particular, successive positions of the input object can be determined, for example to recognize a click input or a gesture input. The 3D-points correspond to the input object may be understood such as the 3D-points geometrically represent the input object, i.e. being an at least partial virtual representation of the input object.

Since an input object generally not only consists of parts that are relevant for a touchless input, but also has peripheral parts, the part that is relevant for a touchless input must be identified. The input object is represented by the set of 3D-points as described above. Since the set of 3D-points corresponds to the input object, it includes not only the relevant part for a touchless input, but also the peripheral parts that are not relevant for the touchless input. The method step of determining a touchless control pointer allows to find and recognize the relevant part of the input object based on the set of 3D-points. In other words, the touchless control pointer which is determined, represents the said relevant part of the input object. Therefore, the touchless control pointer may be understood to be a 3D-point which either is defined as an additional 3D-point based on the set of 3D-points, or coincide with one or more 3D-points in the set of 3D-points.

It may be provided that the touchless control pointer corresponds to a center point of an input object or to a tip of an input object or to a central point of a tip of an input object. The tip of an input object may be a tip which is facing the electronic display. In particular, if a finger is used as an input object, the touchless control pointer may be the fingertip or the center of the fingertip, which is preferably determined from the 3D-points.

Determining the touchless control pointer when a finger is used as an input object may for example be performed as follows: First, the user's hand is detected by means of the first and the second depth camera, wherein one finger is extended pointing towards the electronic display. The data captured by the first depth camera corresponds to a first subset of 3D-points and the data captured by the second depth camera corresponds to a second subset of 3D-points. The two subsets of 3D-points form a set of 3D-points representing the user's hand. The highest elevation of the hand in the direction of the electronic display is detected, which is the index finger that the user extends. The 3D-points located in an area around the detected highest elevation, i.e. at the tip of the index finger, are used to determine the touchless control pointer. For this purpose, a center point is determined from the 3D-points, including the weighting of the points. In particular, the center point calculation can be the calculation of a geometric center point in 3D space. Preferably, the center of gravity is not determined, but the center of volume is determined. Further, preferably any inhomogeneity of the density of the 3D points is factored out so as not to cause any displacement of the touchless control pointer to one side of the finger.

The term spatial input area may be understood as an at least partially delimited area, preferably a 3D-area, within an observation area, i.e. field of view, of a respective depth camera. In the spatial input area of a depth camera, the respective depth camera may be able to capture valuable data, in particular image data, in particular in the form of 3D-points. Valuable data means data without or with less undesired discontinuities and/or errors.

In contrast to that, the observation area, i.e. field of view, means a superordinate area in which a depth camera is able to capture data irrespective of possible discontinuities and/or errors. A spatial input area preferably has the shape of a frustum, for example of a cone or of a pyramid. The frustum may be defined to be open in observation direction of the camera. It may be provided that the first spatial input area and second spatial input area at least partially overlap.

The term spatial boundary may be understood as the aforementioned delimitation of the spatial input area. Since the spatial input area may be partially open in one or more directions, as described above, the spatial boundary may be defined to delimit the spatial boundary only partially, for example at a proximal end of the spatial boundary facing the respective depth camera.

The term touchless input includes any type of interaction of a user with the electronic display without the user being required to make physical contact. Examples for a touchless inputs are movements of a cursor which is displayed to the user via the electronic display, click operations or gestures.

If it is determined that the touchless control pointer is within the first spatial input area and within the second spatial input area, the position may be precise and no substantial discontinuities and/or errors may occur. But in case that the input object is moved such that it is determined that the touchless control pointer is moved outside, for example, the first spatial input area, i.e. crossing the first spatial boundary, it can be assumed that too many 3D-points of the first subset of 3D-points are outside the spatial input area such that the position of the touchless control pointer is determined to be outside the spatial input area. In this situation, 3D-points of the first subset of the 3D-points may jump erratically to different positions and cause major errors in the positioning of the touchless control pointer. The touchless control pointer and therefore also a cursor displayed to a user, for example as a hovering cursor, may show confusing undesired leaps.

The result of determining the position of the touchless control pointer would be more accurate in such a case if the 3D-points of the first subset of 3D-points were disregarded, i.e. were not taken into account when determining the position of the touchless control pointer. An abrupt fading out of the 3D-points of the first subset of 3D-points would, however, also lead to undesired discontinuities, e.g. leaps. The time-controlled fading provided by the first aspect of the present invention solves this problem and enables a smooth fade out and fade in of the 3D-points of a respective subset.

In this respect, time-controlled fading which provides fading in or fading out within a period of time, facilitates a smooth user experience. Undesired discontinuities and/or errors, such as a leap of the touchless control pointer causing a corresponding leap of a cursor, impairing the touchless interaction, are therefore prevented.

In various implementations of a touchless user-interface control method, it may be provided that the position of the input object is displayed to the user on the electronic display irrespective of a specific input such that the user can see where on the electronic display he is pointing. For example, a hovering cursor may be provided, wherein the position of the hovering cursor corresponds to the position of the input object. In other words, the hovering cursor may visualize the position of the input object in order to support the user even before an actual input, e. g. a click input or gesture input, is made. In these implementations, the proposed method is particularly advantageous due to the fact that discontinuities would be directly visible to the user and cause confusions.

It may be provided that time-controlled fading includes: if the touchless control pointer moves from inside to outside the first spatial input area crossing the first spatial boundary, the first subset of 3D-points is faded out within a period of time, and/or if the touchless control pointer moves from inside to outside the second spatial input area crossing the second spatial boundary, the second subset of 3D-points is faded out within a period of time, and/or if the touchless control pointer moves from outside to inside the first spatial input area crossing the first spatial boundary, the first subset of 3D-points is faded in within a period of time, and/or if the touchless control pointer moves from outside to inside the second spatial input area crossing the second spatial boundary, the second subset of 3D-points is faded in within a period of time.

As described above, fading out or fading in is performed in a time-controlled manner in order to facilitate a smooth user experience and prevent undesired discontinuities and/or errors. Every time the touchless control pointer crosses a spatial boundary, i.e. moving out or in a respective spatial input area, time-controlled fading is performed. The fading encompasses all 3D-points of a respective subset of 3D-points, i.e. all 3D-points which are captured by a respective camera. In other words, it can be said that one camera is faded out. By that, the risk of the occurrence of discontinuities and/or errors is reduced significantly compared with partial fading of a respective subset of 3D-points or fading of single 3D-points.

The spatial input areas may be distanced in a respective observation direction from the respective depth camera.

The level of discontinuities and/or errors usually increases in areas close to the depth camera. By defining the respective spatial input areas in a distanced manner from the respective depth camera, this matter of fact is taken into account, since as described above, the spatial input areas may be understood as an at least partially delimited area in which a respective depth camera may be able to capture valuable data without or with less undesired discontinuities and/or errors.

The method may provide that the first spatial boundary is arranged at a predetermined part of the first spatial input area, preferably facing towards the first depth camera, wherein the second spatial boundary is arranged at a predetermined part of the second spatial input area, preferably facing towards the second depth camera.

A high level or number of discontinuities and/or errors can occur in particular at certain sections of a respective spatial input area. In particular, many discontinuities and/or errors can occur in sections close to a respective depth camera. Thus, it may be desirable only to provide those sections of the spatial input area with a spatial boundary which are affected by many discontinuities and/or errors.

The method may comprise weighting of the 3D-points, wherein weights are assigned to the 3D-points. In particular, a weight may be assigned to a subset of 3D-points, in particular to the first subset of 3D-points and/or to the second subset of 3D-points.

By assigning weights to the 3D-points of a subset of 3D-points fading out and fading in of a subset of 3D-points may be implemented efficiently. A weight of a 3D-point can be understood as the valence of a point relative to the other points.

The weights may be taken into account when determining the position and/or shape of the input object, i.e. for determining the position of the touchless control pointer. The weights may therefore be the tool for stabilizing and smoothening the detected position of the input object, i.e. of the touchless control pointer.

It may be provided that weighting is performed based on a weighting function, the weighting function preferably having a range from 0 to 1 and being suitable for assigning weights to each 3D-point and/or to a subset of 3D-points.

The method may provide that time-controlled fading is performed using the weighting, wherein for fading out 3D-points the respective weights are reduced from 1 to 0 within a period of time, and preferably for fading in 3D-points, the respective weights are increased from 0 to 1 within a period of time.

It may be provided that the weighting function is a linear function providing continuous time-controlled fading, wherein the period of time is preferably 0.5-5 seconds, preferably 1-4 seconds, preferably 1.5-3 seconds, preferably 1.8-2.5 seconds, preferably approximately 2 seconds.

In various tests of the method according to the first aspect of the present invention with experienced and unexperienced users, a period of 2 seconds as predetermined period of time has proven to be particularly advantageous with respect to the user experience.

The method may provide that if one subset of 3D-points is faded out, determining the touchless control pointer is performed solely based on remaining subset(s) of 3D-points not being faded out.

It may be provided that if one subset of 3D-points is faded out, the respective depth camera is deactivated.

Deactivation of a respective depth camera is possible since, as described above, a subset of 3D-points is faded out as a whole and not partially or by single 3D-points. It may be optionally provided that the respective depth camera is switched in a sleep mode if fading out is performed, and performs wakeup from the sleep mode if fading in is performed. Thereby, an energy-saving operation of the cameras can be provided.

Further, a deactivation of a depth camera reduces the data stream to be processed. Thus, the required computing power can be temporary reduced.

It may be provided that the period of time is adjustable.

With the definition of the period of time, a desired balance can be found between the risk of temporary discontinuities due to the false detection of 3D-points and the risk of a 1-time leap at the spatial boundary of a respective spatial input area. If the period of time is very short, e.g. 0 seconds or a few milliseconds, the first subset of 3D-points is completely deactivated when the touchless control pointers leaves the first spatial input area and crosses the first spatial boundary. At the moment of crossing the first spatial boundary there will be a leap, because the touchless control pointer will then only be determined on the basis of the second subset of 3D-points, whereas before that moment, the touchless control pointer was determined based on the first and second subsets of 3D-points. However, the leap will usually be only a few centimeters.

If the period of time in the same constellation is chosen to be particularly long, for example over 5 seconds, the first subset of 3D-points, which includes 3D-points with major errors, will influence the position of the touchless control pointer. This can lead to flickering or leaping of the touchless control pointer and thus, for example, of a cursor that is displayed visibly to the user.

The method may comprise outputting a signal upon performing time-controlled fading, preferably a visual signal displayed on the electronic display and/or an acoustic signal.

Outputting of a signal may be particularly advantageous for unexperienced users for getting familiar with the touchless user-interface control method.

According to a second aspect of the present invention, a use of a depth camera in a method according to the first aspect of the present invention, may be provided.

According to a third aspect of the present invention, a data processing apparatus, preferably an electronic display, is provided. The data processing apparatus may comprise means for carrying out a method according to the first aspect of the present invention.

According to a fourth aspect of the present invention, a computer program may be provided, comprising instructions which, when the program is executed by a computer, cause the computer to carry out a method according to the first aspect of the present invention.

All technical implementation details and advantages described with respect to the first aspect of the present invention are self-evidently mutatis mutandis applicable for the second, third and fourth aspects of the present invention.

BRIEF DESCRIPTION OF THE DRAWINGS

The disclosure may be better understood by reference to the following drawings.

DESCRIPTION OF PREFERRED EMBODIMENTS

Figure 1:
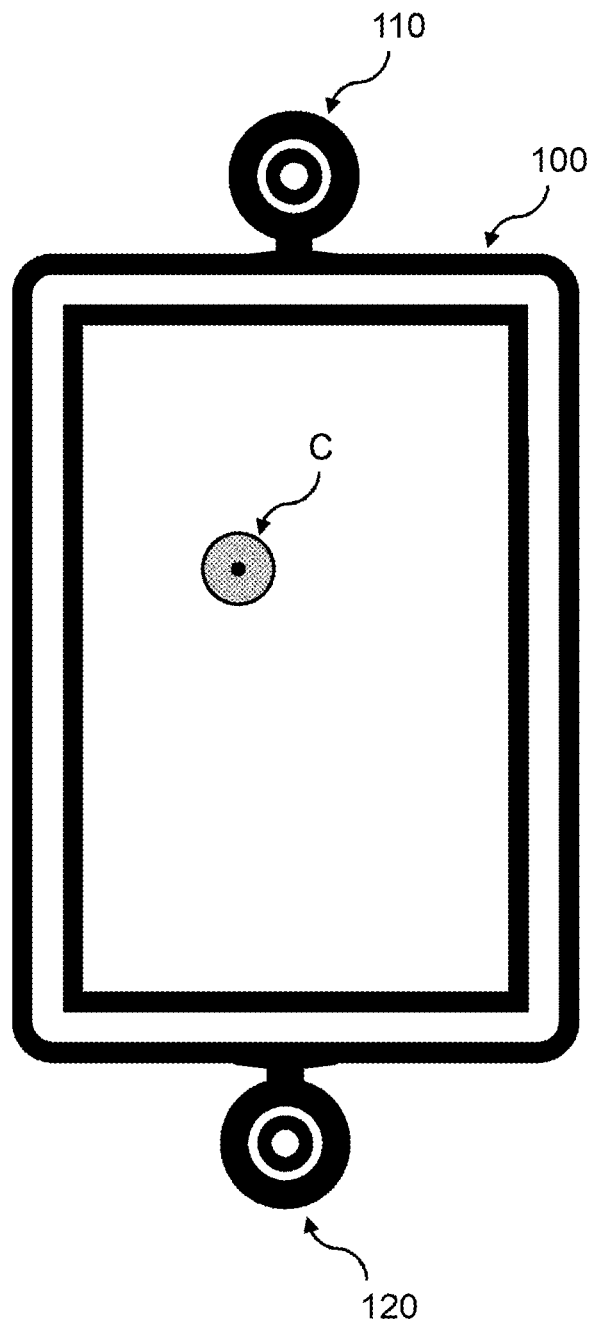
FIG. 1: A schematic illustration of an electronic display according to embodiments of the present invention.

FIG. 1 is a first schematic illustration of an electronic display 100. Two depth cameras 110, 120 are mounted at edges of the electronic display 100, a first depth camera 110 at the upper edge and a second depth camera 120 at the lower edge. The electronic display 100 displays a cursor C which hovers on the electronic display 100 corresponding to a user input, in particular using an input object 200. The input object 200 may be a finger of a user, a hand of a user, the arm of a user, or a dedicated input device having for example the shape of a pen, as it is exemplarily shown in FIG. 11.

Figure 2:
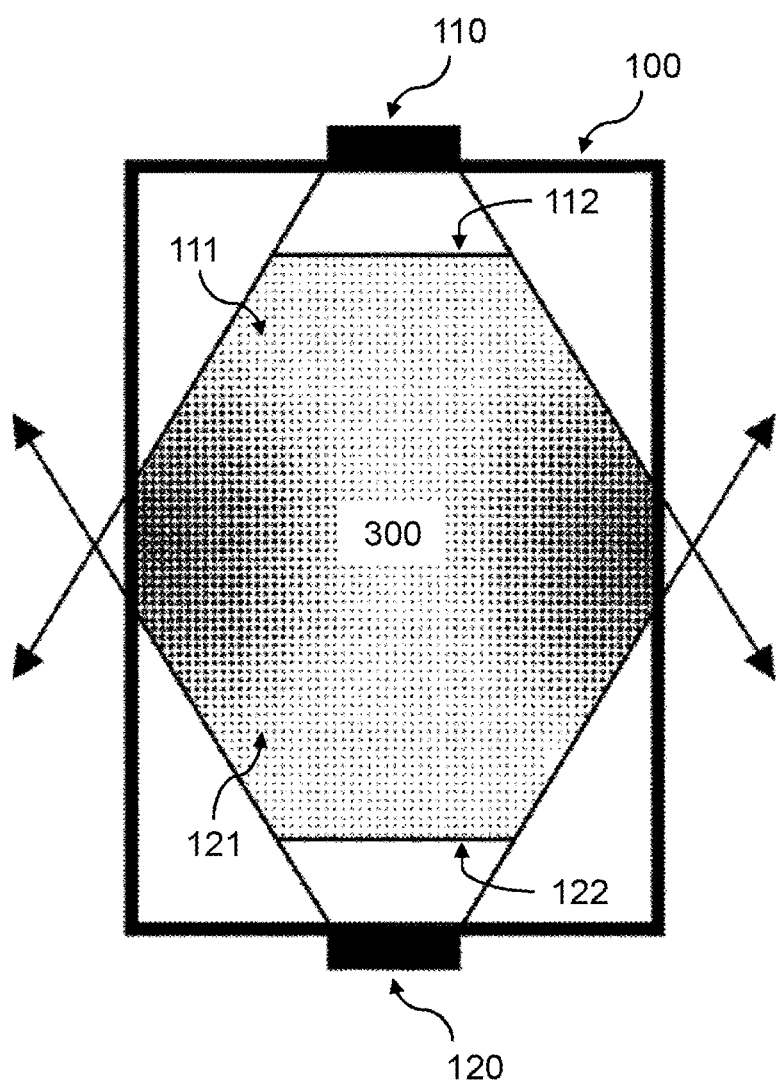
FIG. 2: A schematic illustration of an electronic display with a 2D-view of spatial input areas according to embodiments of the present invention.

FIG. 2 schematically illustrates a first spatial input area 111 of the first depth camera 110 and a second spatial input area 121 of the second depth camera 120. The first depth camera 110 and second depth camera 120 are essentially facing each other due to their mounting positions as describes above. Thus, the first spatial input area 111 and the second spatial input area 121 have an overlap which is illustrated by dots in FIG. 2. The depicted interaction area 300 is in general independent from the overlapping area of the first and second spatial input area 111, 121. Thus, the interaction area 300 may be understood covering a meaningful part of the field of views of both depth cameras 110, 120, particularly also including the corners of the electronic display 100 where apparently there is no overlap of the spatial input areas 111, 121. However, in a specific embodiment, the interaction area 300 may be equal to the overlapping area of the first and second spatial input area 111, 121. The first spatial input area 111 comprises a first spatial boundary 112 and the second spatial input area 121 comprises a second spatial boundary 122.

When using the electronic display 100, i.e. when a user interacts with the electronic display 100, user input is directed to various positions on the electronic display 100. For example, an icon can be clicked which closes a displayed window. The icon may be positioned at the top right of the electronic display 100. The user uses an input object 200, for example his finger, for his user input. Since an input object 200 generally not only consists of parts that are relevant for a touchless input, but also has peripheral parts, the part that is relevant for a touchless input must be identified. The input object 200 is represented by the set of 3D-points 210 as described above. Since the set of 3D-points 210 corresponds to the input object 200, it includes not only the relevant part for a touchless input, but also the peripheral parts that are actually not relevant for the touchless input. Determining a touchless control pointer P allows to find and recognize the relevant part of the input object 200 based on the set of 3D-points 210. In other words, the touchless control pointer P which is determined, represents the said relevant part of the input object 200. Therefore, the touchless control pointer P may be understood to be a 3D-point which either is defined as an additional 3D-point based on the set of 3D-points, or coincide with one or more 3D-points in the set of 3D-points 210. For example, the touchless control pointer P may correspond to a center point of an input object 200 or to a tip of an input object 200 or to a central point of a tip of an input object 200. The tip of an input object 200 may be a tip which is facing the electronic display 100. In particular, if a finger is used as an input object 200, the touchless control pointer P may be the fingertip or the center of the fingertip, which is preferably determined from the 3D-points.

For different user inputs or interactions, the input object 200, in particular the touchless control pointer P, is located at a different position in the spatial area or interaction area 300, or is moved in the spatial area or interaction area 300. The position of the touchless control pointer P in the spatial area or interaction area 300 logically also defines the position of the touchless control pointer P relative to the depth cameras 110, 120. Depending on the relative position of the touchless control pointer P relative to the depth cameras 110, 120, one or the other depth camera 110, 120 can recognize the input object 200, in particular the position of the touchless control pointer P, in the spatial area or interaction are 300 more precisely or less precisely or even erroneous. Thus, it is advantageous to only rely on the depth camera(s) 110, 120 which recognize the input object 200, in particular the position of the touchless control pointer P, correctly. However, a sudden fading out of 3D-points leads to undesired jumps or leaps in the position of the touchless control pointer P which may impair the user experience and cause confusion. Therefore, time-controlled fading according to the present invention is performed with respect to the first or the second subset 211, 212 of 3D-points, i.e. with respect to the first or the second depth camera 110, 120 whenever the touchless control pointer P crosses a respective spatial boundary 112, 122.

Figure 3:
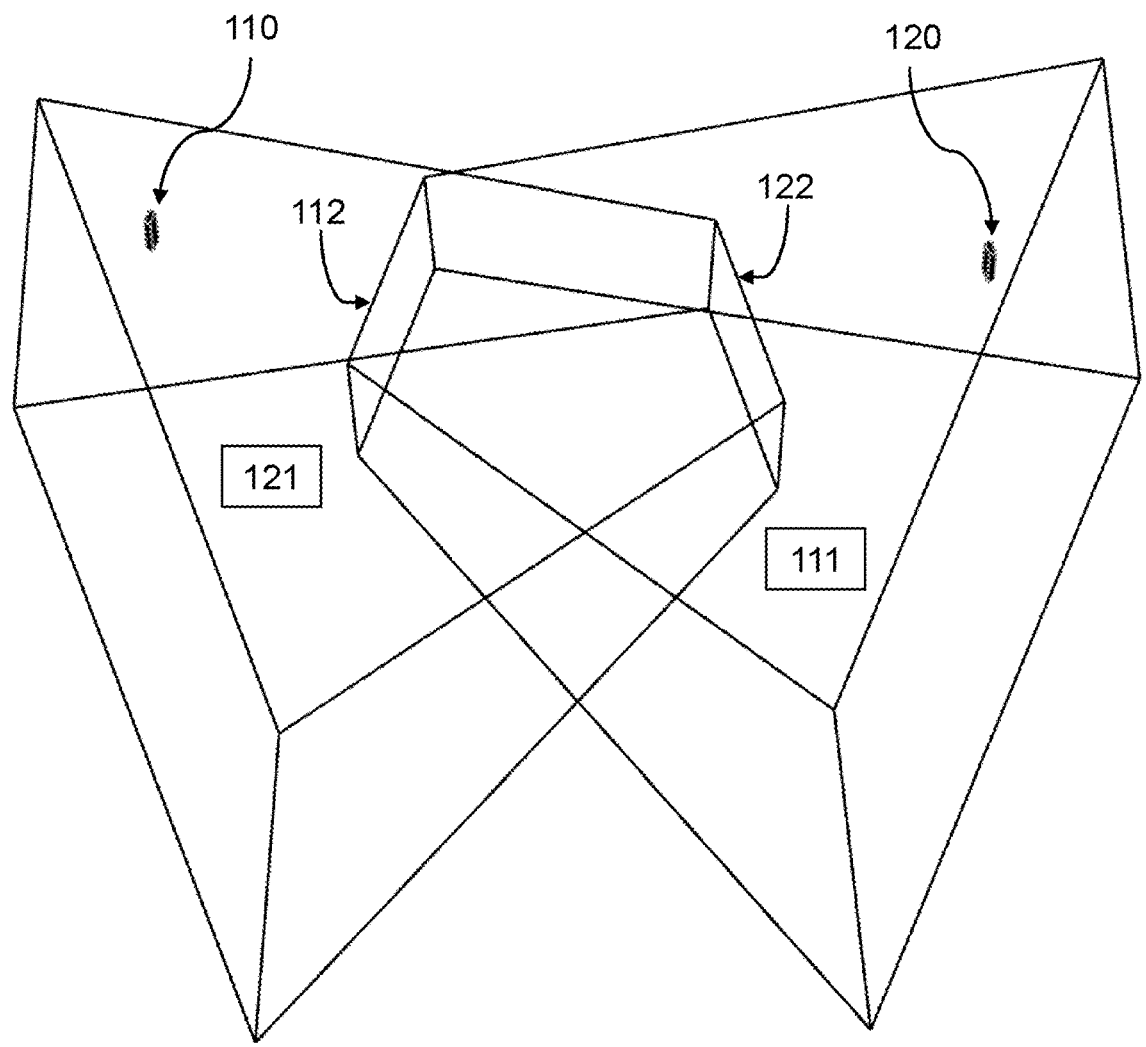
FIG. 3: A schematic illustration of spatial input areas in a 3D-view according to embodiments of the present invention.
Figure 4A:
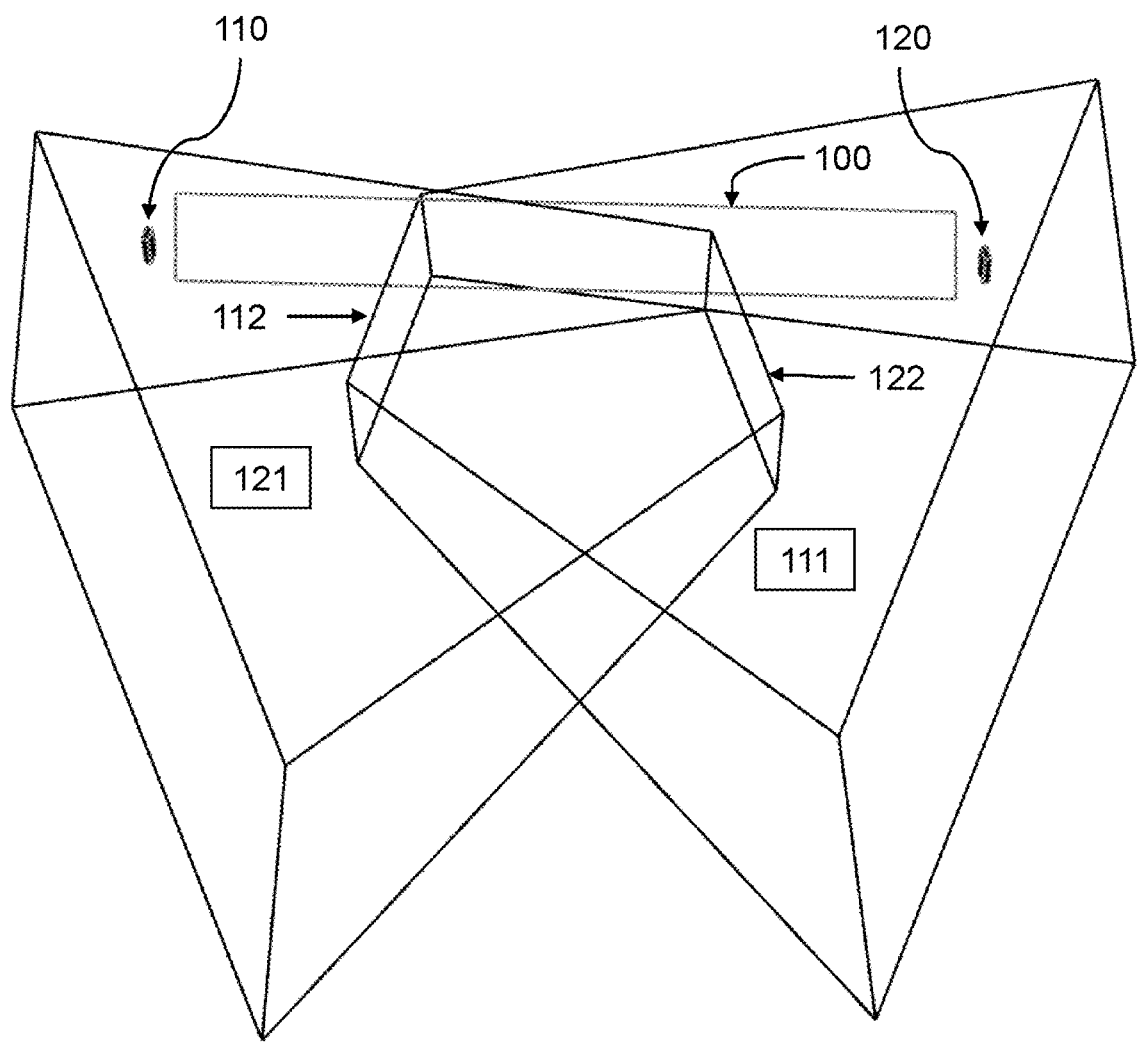
FIG. 4a: A first schematic illustration of spatial input areas in a 3D-view including an illustration of an electronic display according to embodiments of the present invention.
Figure 4B:
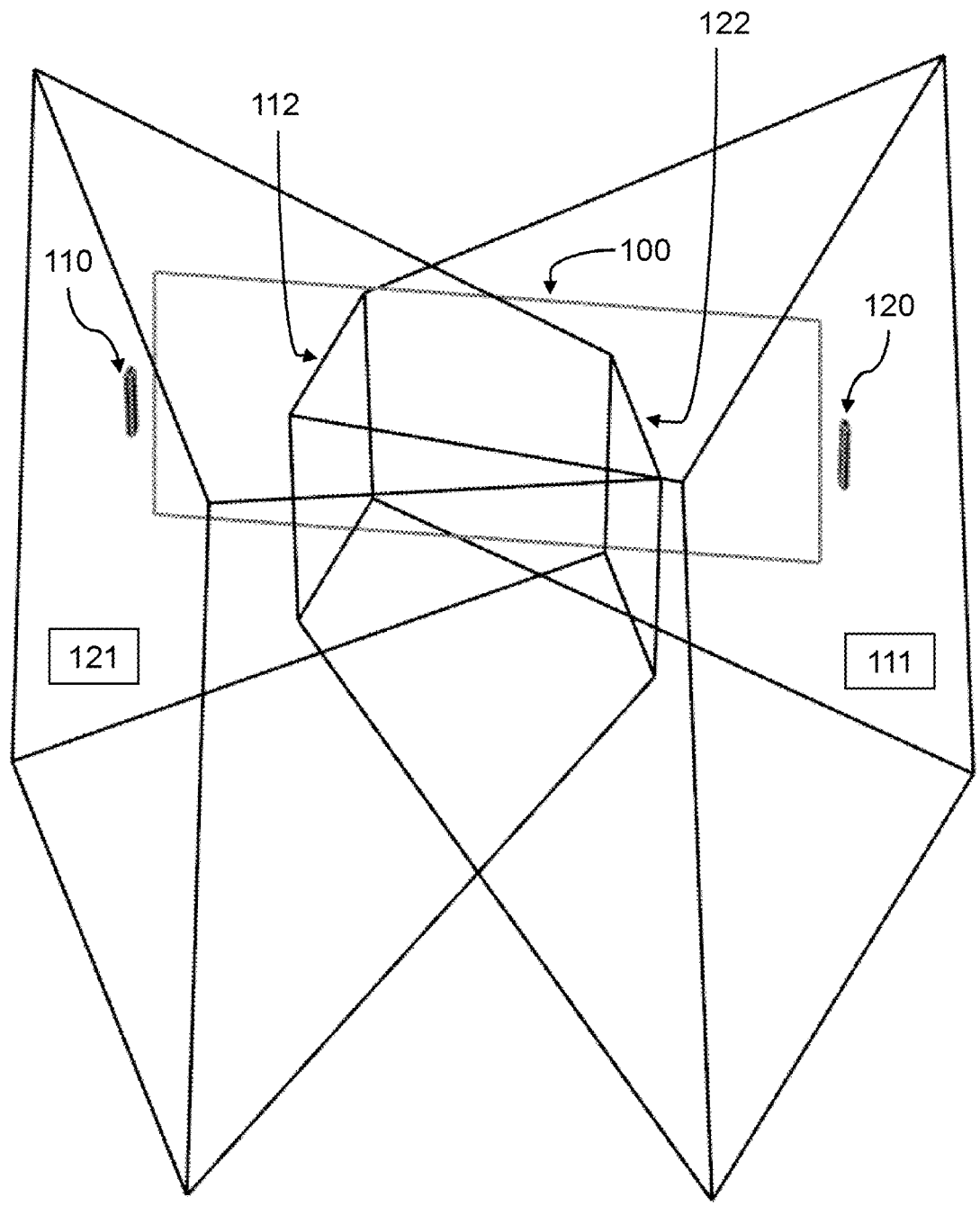
FIG. 4b: A second schematic illustration of spatial input areas in a 3D-view including an illustration of an electronic display according to embodiments of the present invention.
Figure 4C:
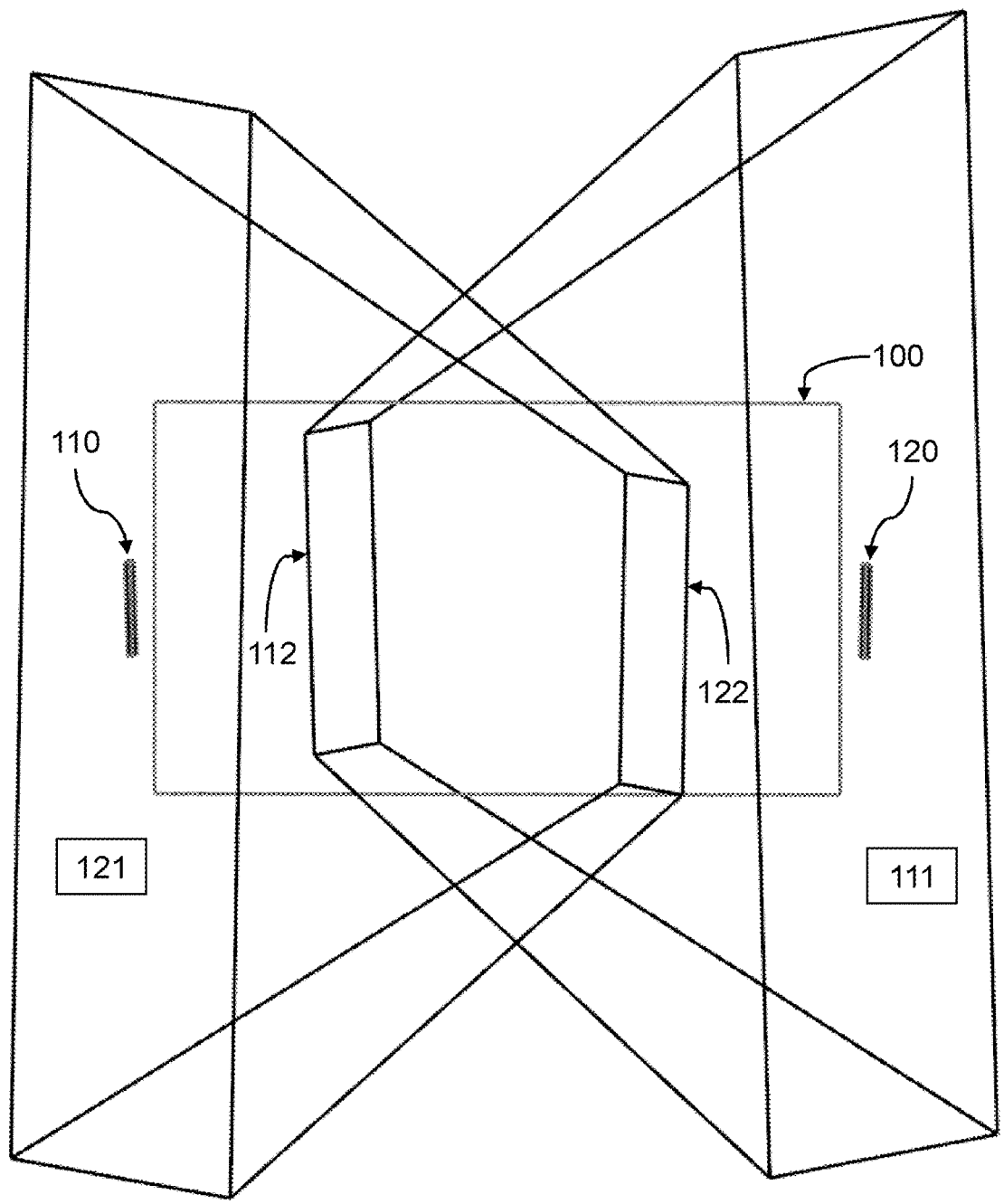
FIG. 4c: A third schematic illustration of spatial input areas in a 3D-view including an illustration of an electronic display according to embodiments of the present invention.
Figure 5:
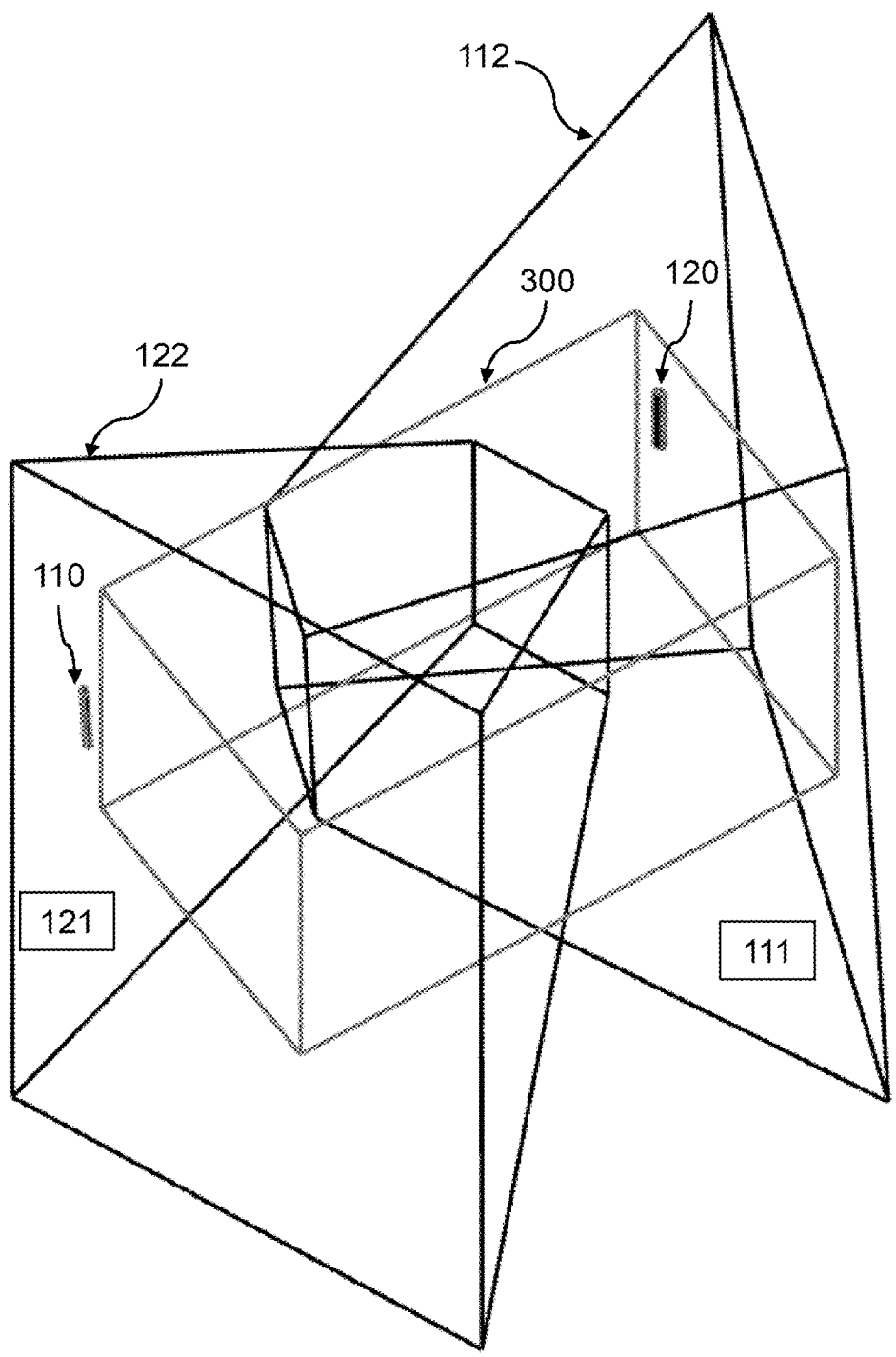
FIG. 5: A schematic illustration of spatial input areas in a 3D-view including an illustration of an interaction area according to embodiments of the present invention.

FIG. 3 is a 3D-view showing the first depth camera 110, the second depth camera 120 and the respective first and second spatial input areas 111, 121. Further, the first and second spatial boundaries 112, 122 are illustrated. In FIGS. 4a, 4b and 4c, it is further illustrated the electronic display 100. Each of the FIGS. 4a, 4b and 4c show a different 3D-perspective for the sake of better comprehensibility. In FIG. 5, it is further illustrated a schematic interaction area 300.

In all FIGS. 3, 4a, 4b, 4c and 5, the respectively illustrated first and second spatial input areas 111, 121 are frustums of a pyramid which are illustrated as closed geometric spaces. Of course, the spatial input areas 111, 121 can also be represented as open frustums of a pyramid, such as in the further figures describes below. Whether the spatial input areas 111, 121 are represented as closed or open geometric entities has no influence on the definition of the respective spatial boundaries 112, 122, because as already discussed in the upper part of the present description, a spatial boundary 112, 122 can also be defined for a part of the edges of the respective spatial input area 111, 121. In a preferred embodiment, a respective spatial boundary 112, 122 of a spatial input area 111, 121 is defined only for the upper frustum surface of the corresponding frustum of a pyramid forming the spatial input area 111, 121 (facing the respective depth camera). This is a preferred embodiment, since depth cameras 110, 120 often have problems with the precise recording of input objects 200 at close range. By defining the spatial boundaries 112, 122 according to this preferred embodiment, 3D-points which are captured in a close range to a recording depth camera 110, 120, are faded out in order to get more precise, in particular unadulterated, 3D-points through the other depth camera(s) 110, 120.

Figure 6A:
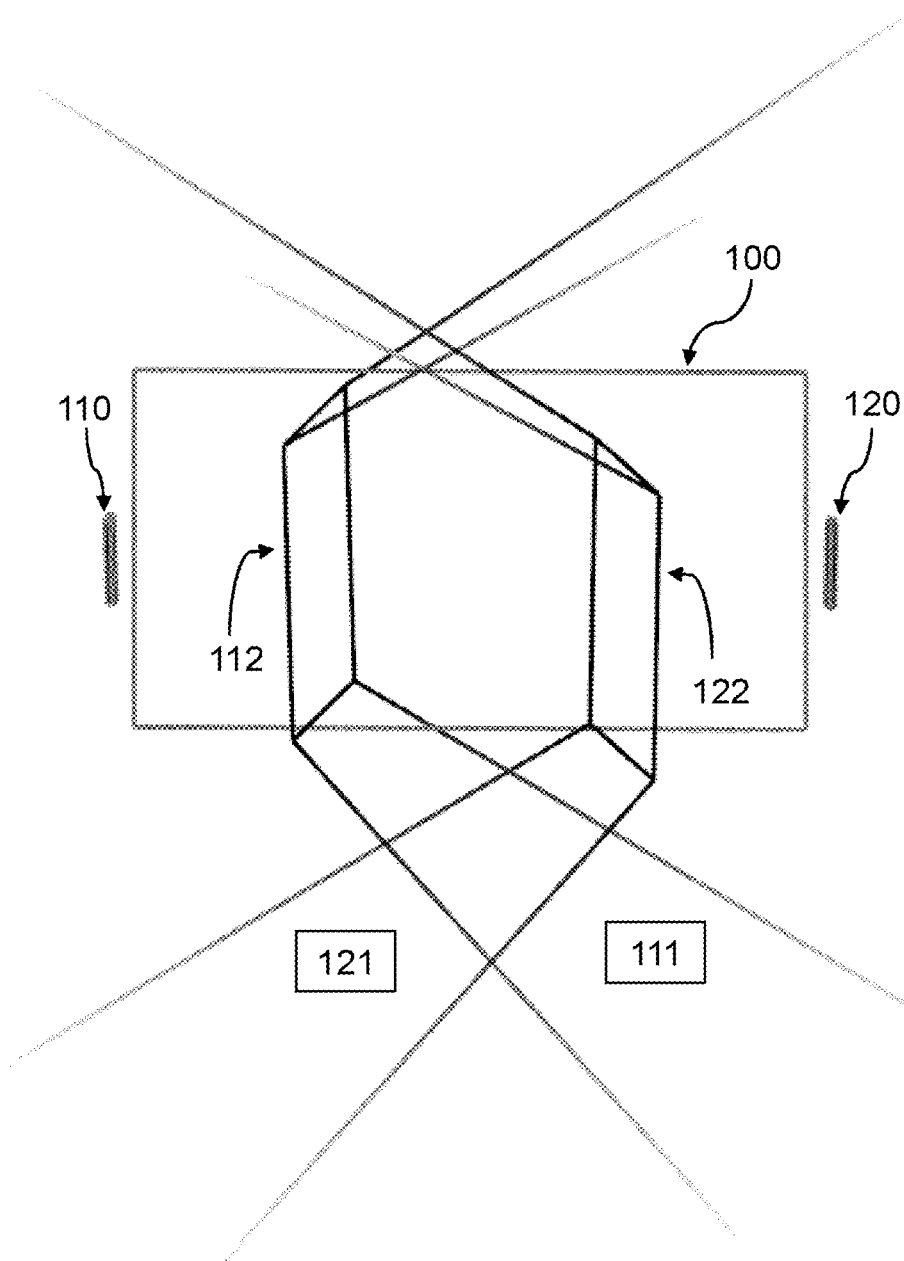
FIG. 6a: A first schematic illustration of spatial input areas in a 3D-view including an illustration of an electronic display, the spatial input areas being open in observation direction of the respective camera according to embodiments of the present invention.
Figure 6B:
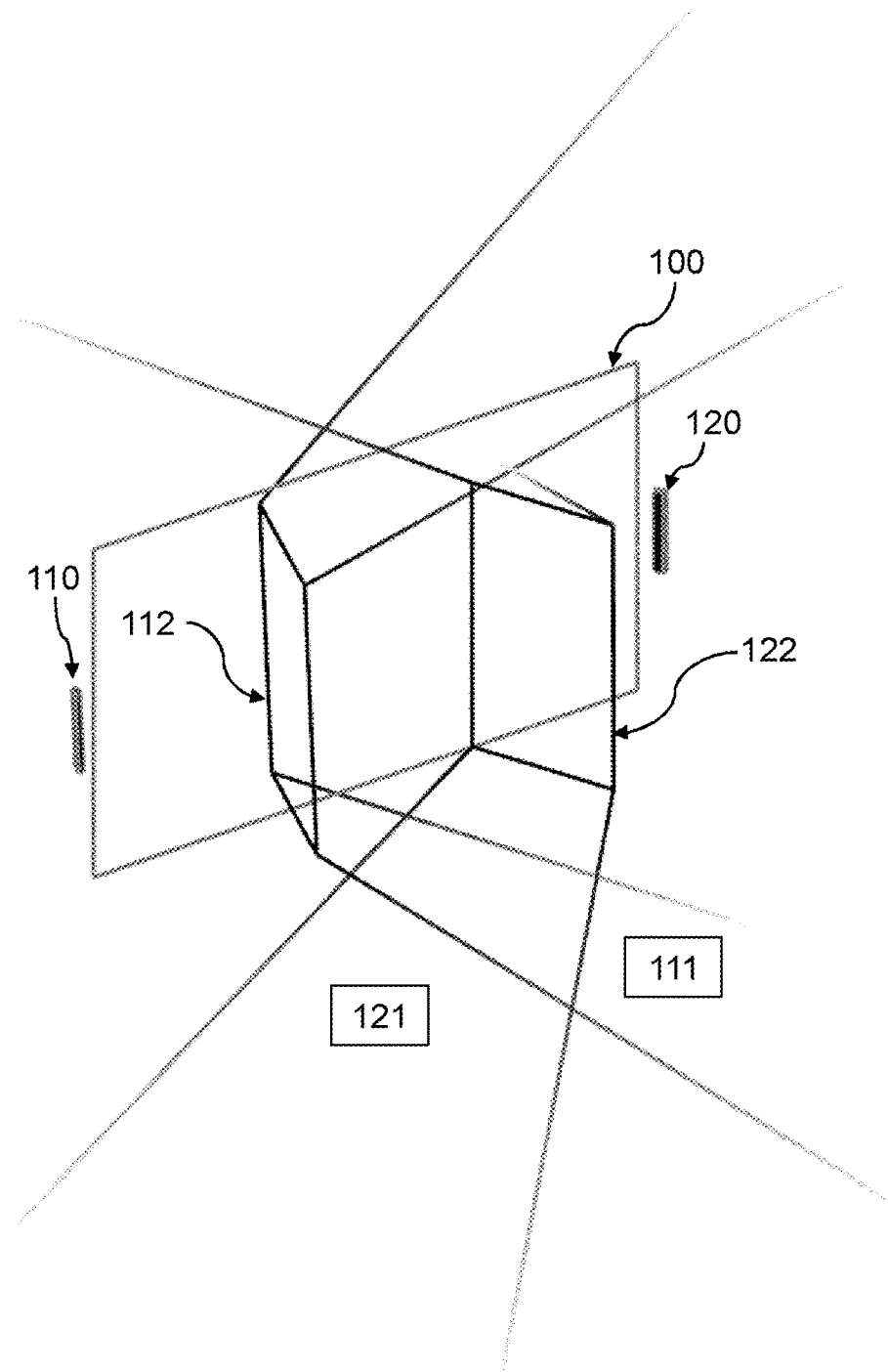
FIG. 6b: A second schematic illustration of spatial input areas in a 3D-view including an illustration of an electronic display, the spatial input areas being open in observation direction of the respective camera according to embodiments of the present invention.

FIGS. 6a and 6b are 3D-views of different perspectives showing an electronic display 100, a first depth camera 110, a second depth camera 120 and respective first and second spatial input areas 111, 121, wherein the input areas 111, 121 are each illustrated as an open frustum of a pyramid. Further, first and second spatial boundaries 112, 122 are illustrated corresponding to the first and second spatial input areas 111, 121 of the first and second depth cameras 110, 120.

Figure 7A:
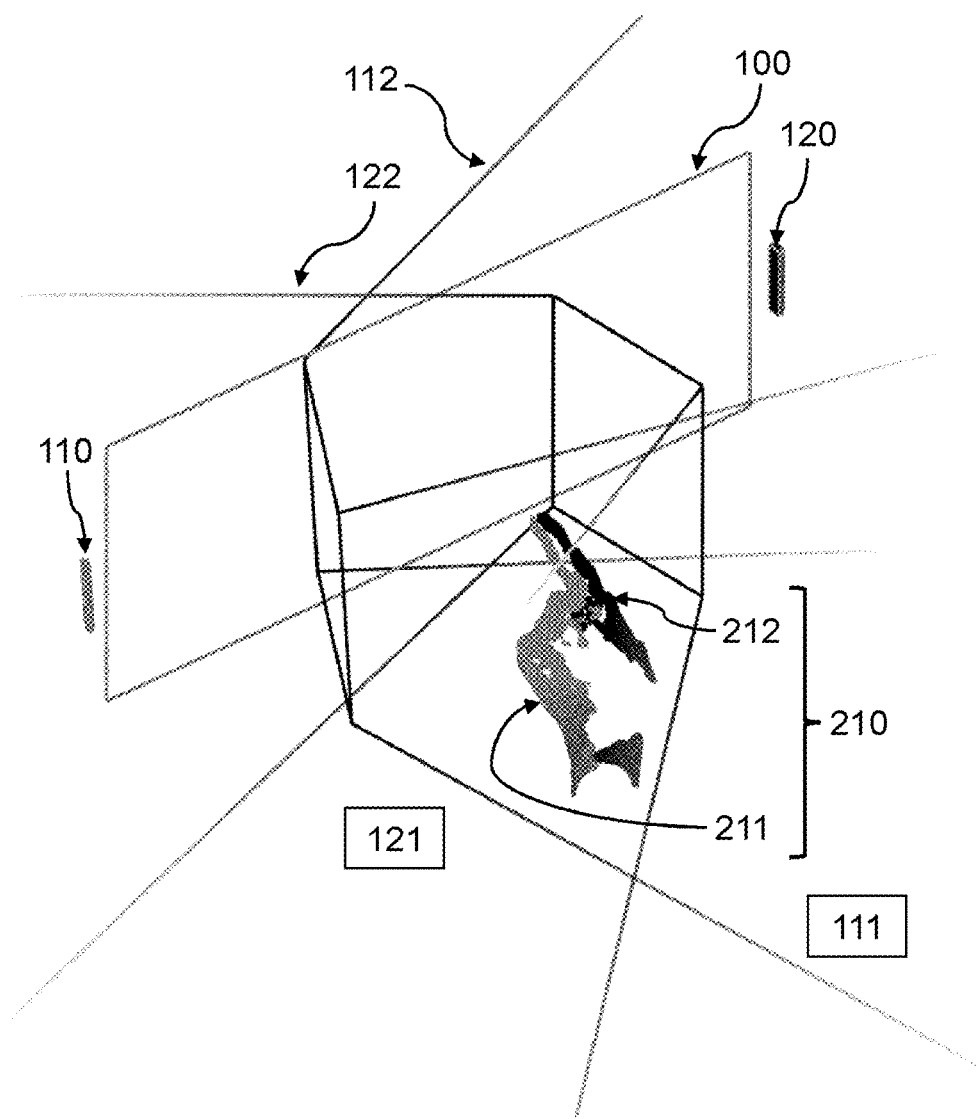
FIG. 7a: A first schematic illustration of spatial input areas in a 3D-view including an illustration of an electronic display and a set of 3D-points corresponding to an input object according to embodiments of the present invention.
Figure 7B:
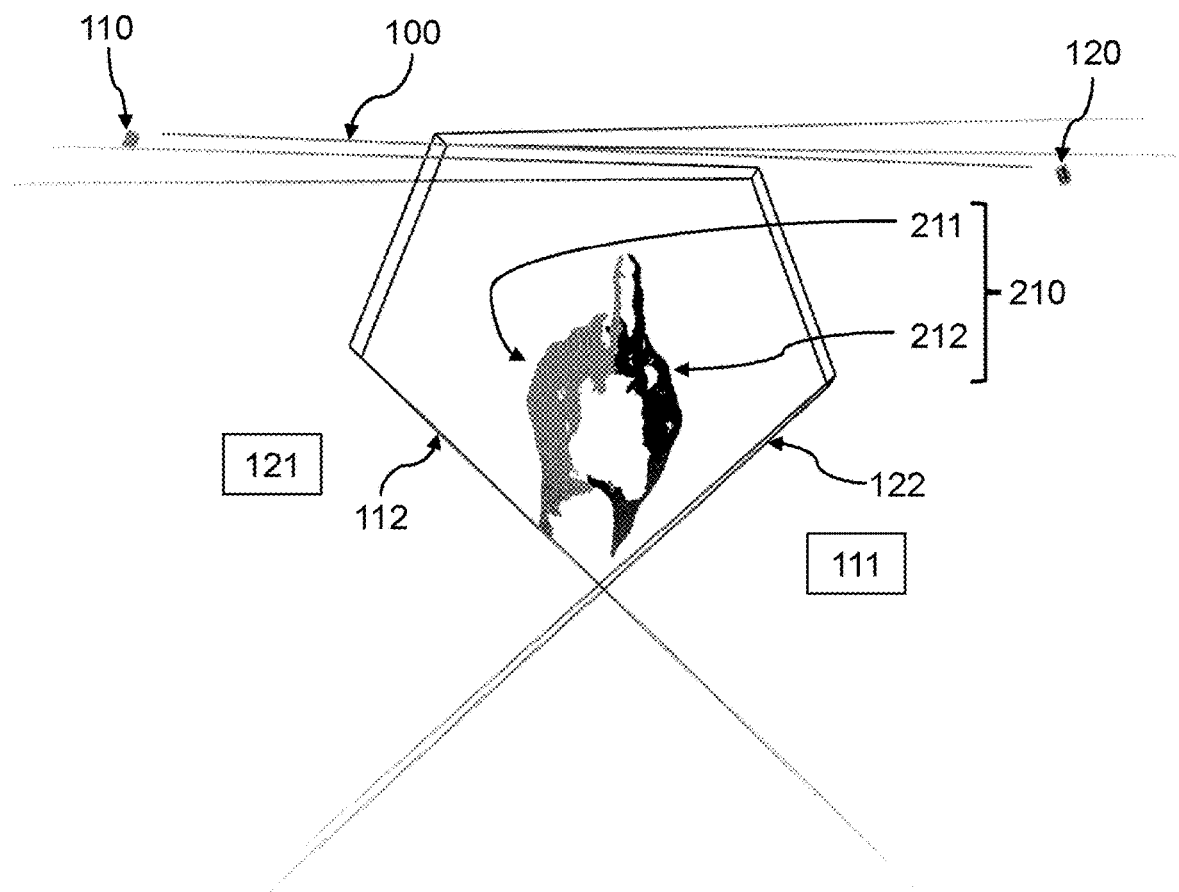
FIG. 7b: A second schematic illustration of spatial input areas in a 3D-view including an illustration of an electronic display and a set of 3D-points corresponding to an input object according to embodiments of the present invention.

FIGS. 7a and 7b are 3D-views of different perspectives further illustrating a set of 3D-points 210 corresponding to an input object 200. The set of 3D-points 210 includes a first subset of 3D-points 211 and a second subset of 3D-points 212. The first subset of 3D-points 211 consists of 3D-points that are defined based on image data captured by the first depth camera 110. And the second subset of 3D-points 212 consists of 3D-points that are defined based on image data captured by the second depth camera 120. For the sake of better comprehensibility, the first depth camera 110 and the first subset of 3D-points 211 are colored in light grey as they belong together. Accordingly, the second depth camera 120 and the second subset of 3D-points 212 are colored in black as they belong together.

Figure 8A:
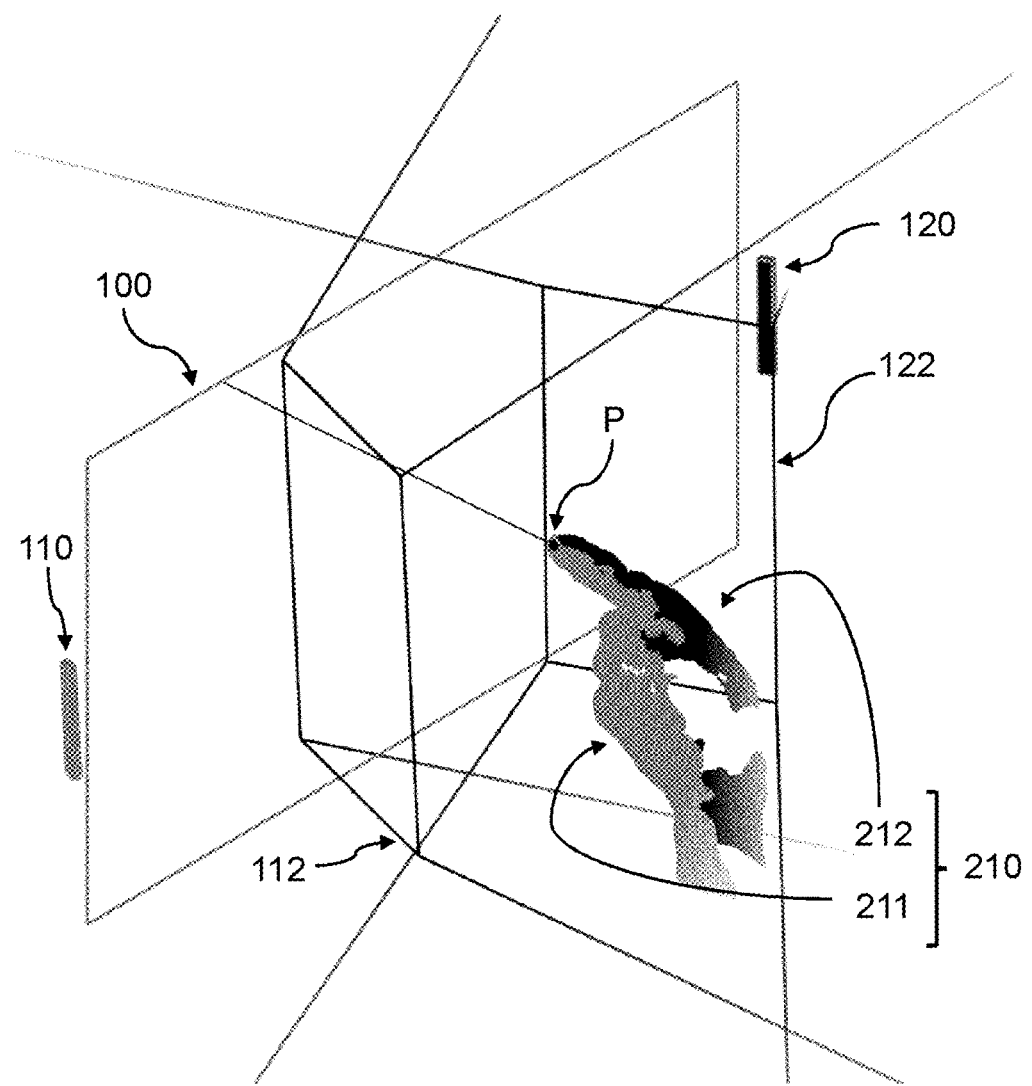
FIG. 8a: A first schematic illustration of spatial input areas in a 3D-view including an illustration of an electronic display, a set of 3D-points corresponding to an input object and a touchless control pointer according to embodiments of the present invention.
Figure 8B:
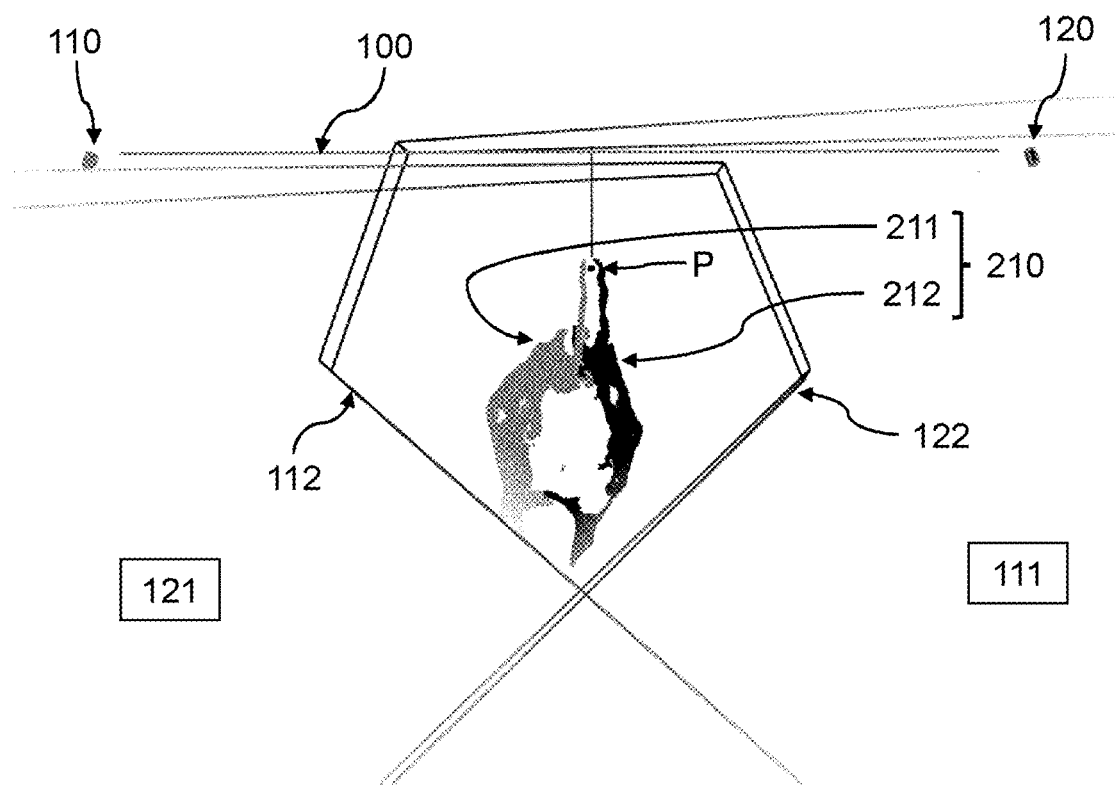
FIG. 8b: A second schematic illustration of spatial input areas in a 3D-view including an illustration of an electronic display, a set of 3D-points corresponding to an input object and a touchless control pointer according to embodiments of the present invention.

FIG. 8a is similar to FIG. 7a, wherein a touchless control pointer P is shown. Accordingly, FIG. 8b is similar to FIG. 7b further showing the touchless control pointer P. The touchless control pointer P may be the result of a spatial center point determination for a part of the set of 3D-points 210, corresponding to an input object 200, that protrudes furthest in the direction of the electronic display 100. It may in particular be provided that the weights of the 3D-points are considered for the determination of the touchless control pointer P. Based on the touchless control pointer P, a cursor C may be defined and shown on the electronic display 100 as a hovering cursor C. The determination of the position of the cursor C may for example include performing a projection of the touchless control pointer perpendicular to the electronic display 100. Optionally, also the shape of the set of 3D-points, including for example the direction in which an elongated part of the input object 200 points, is taken into account. Such elongated part of the input object 200 may, in the example on hand, be the index finger of a hand.

Figure 9A:
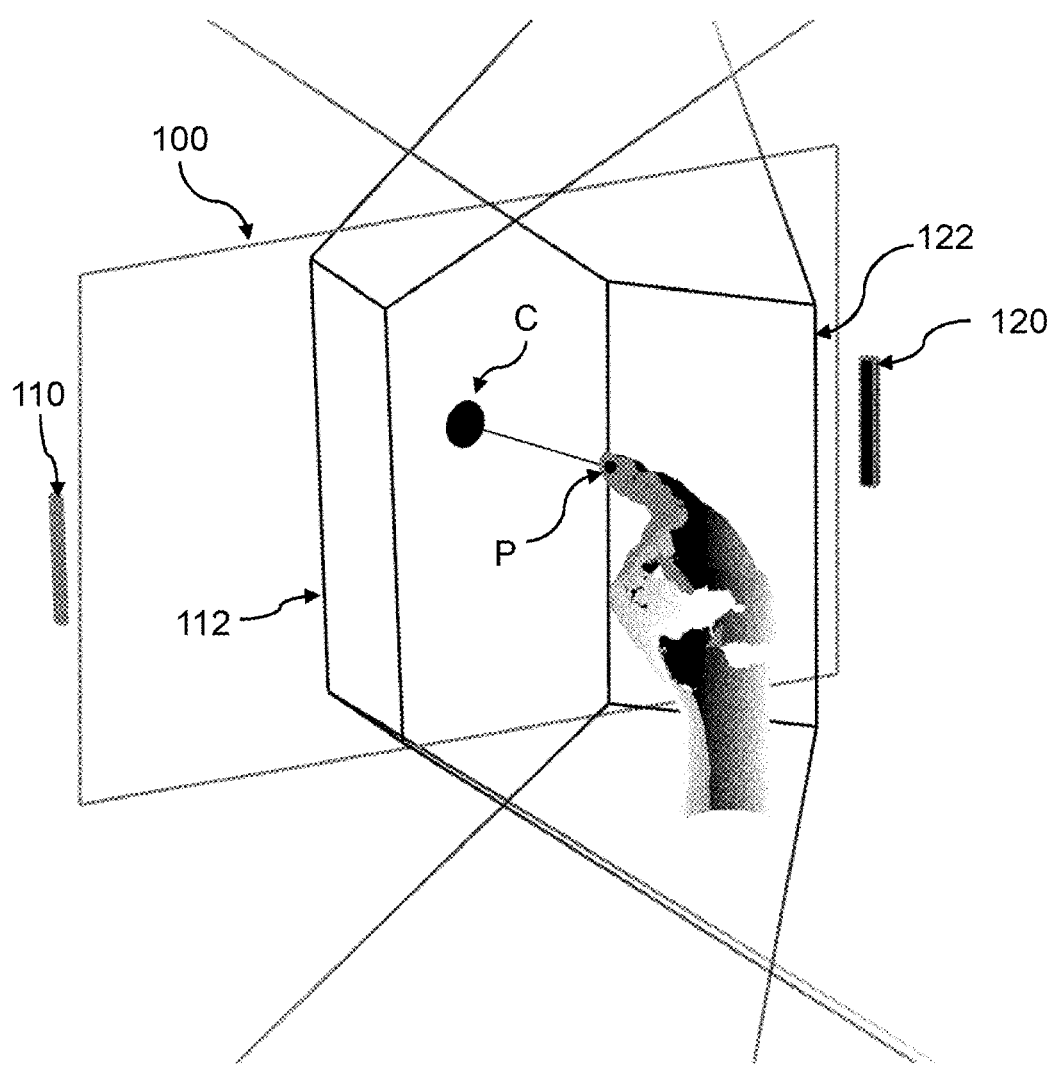
FIG. 9a: A first schematic illustration of spatial input areas in a 3D-view including an illustration of an electronic display, a set of 3D-points corresponding to an input object, a touchless control pointer and a cursor according to embodiments of the present invention.
Figure 9B:
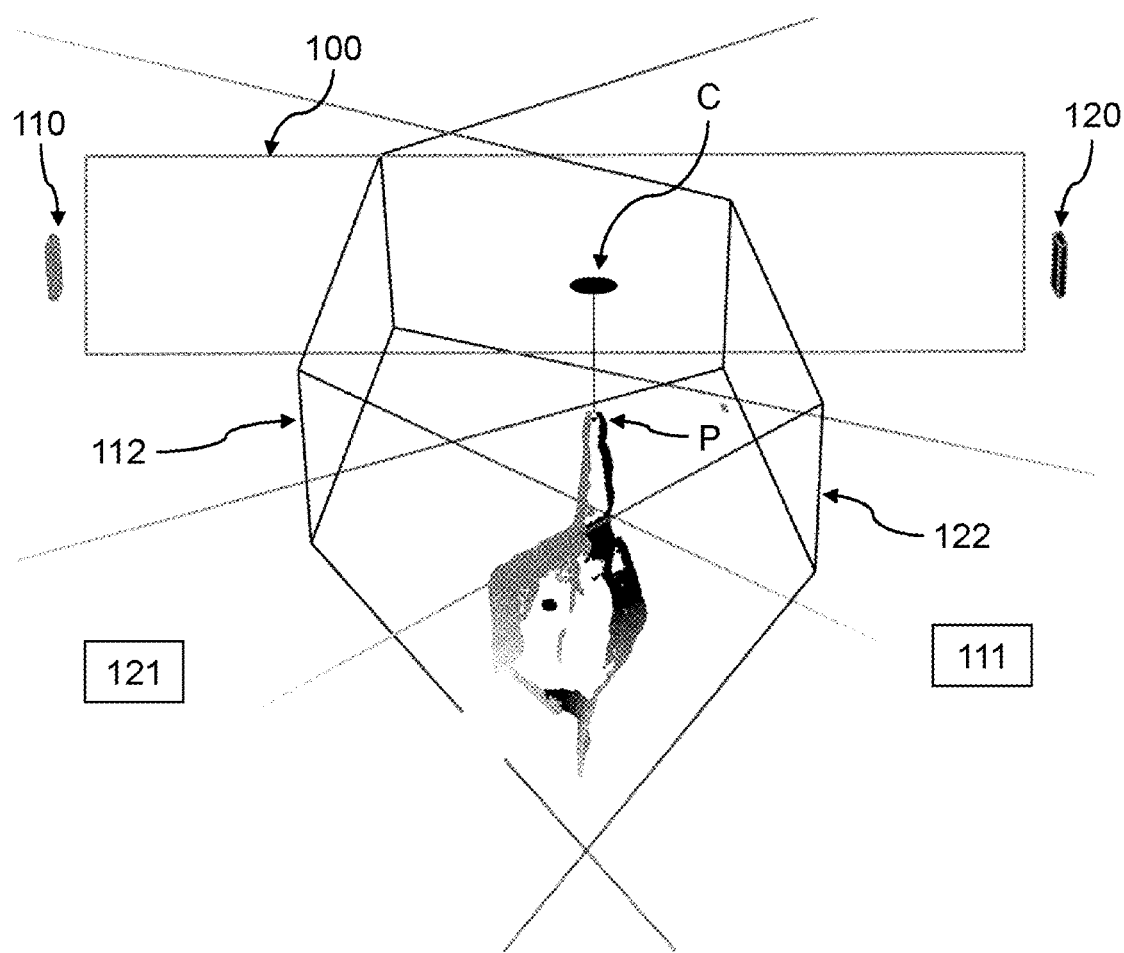
FIG. 9b: A second schematic illustration of spatial input areas in a 3D-view including an illustration of an electronic display, a set of 3D-points corresponding to an input object, a touchless control pointer and a cursor according to embodiments of the present invention.

In FIGS. 9a and 9b, the cursor C is illustrated. Further, for the sake of clarity, a projection line between the touchless control pointer P and the cursor C is depicted.

Figure 10A:
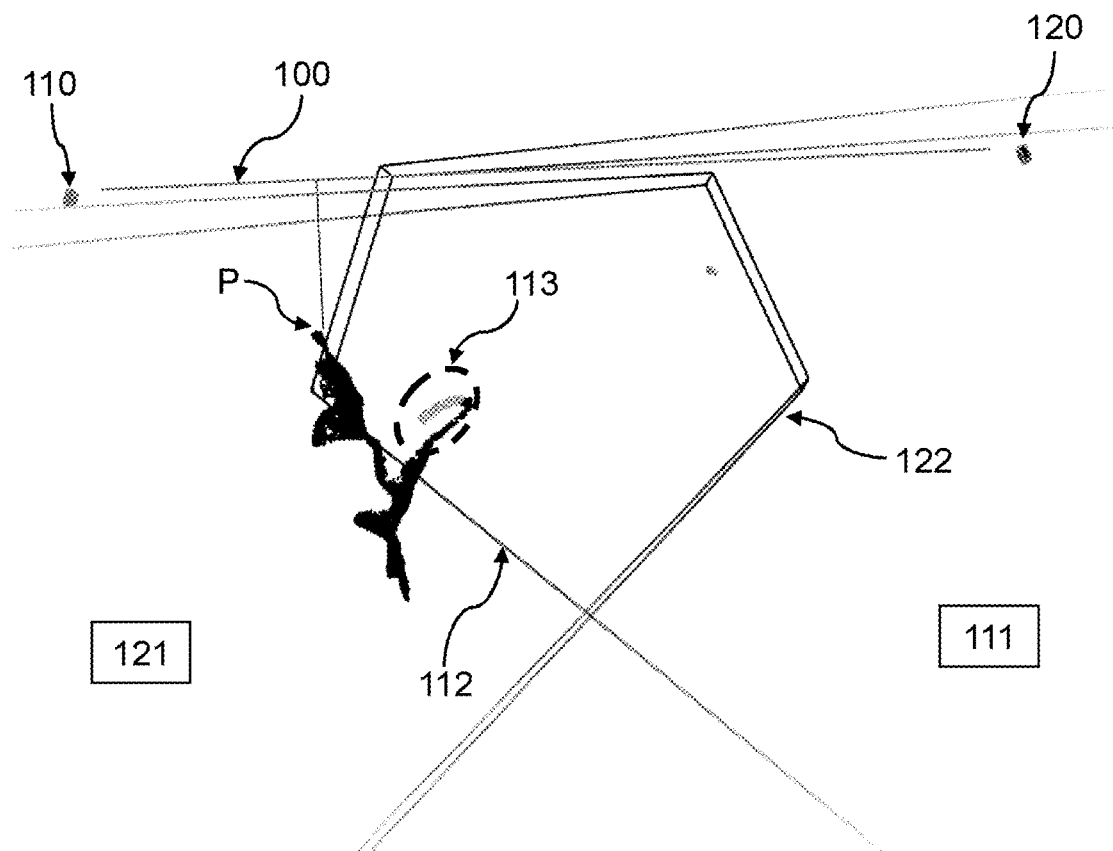
FIG. 10a: A first schematic illustration of performing time-controlled fading according to embodiments of the present invention.
Figure 10B:
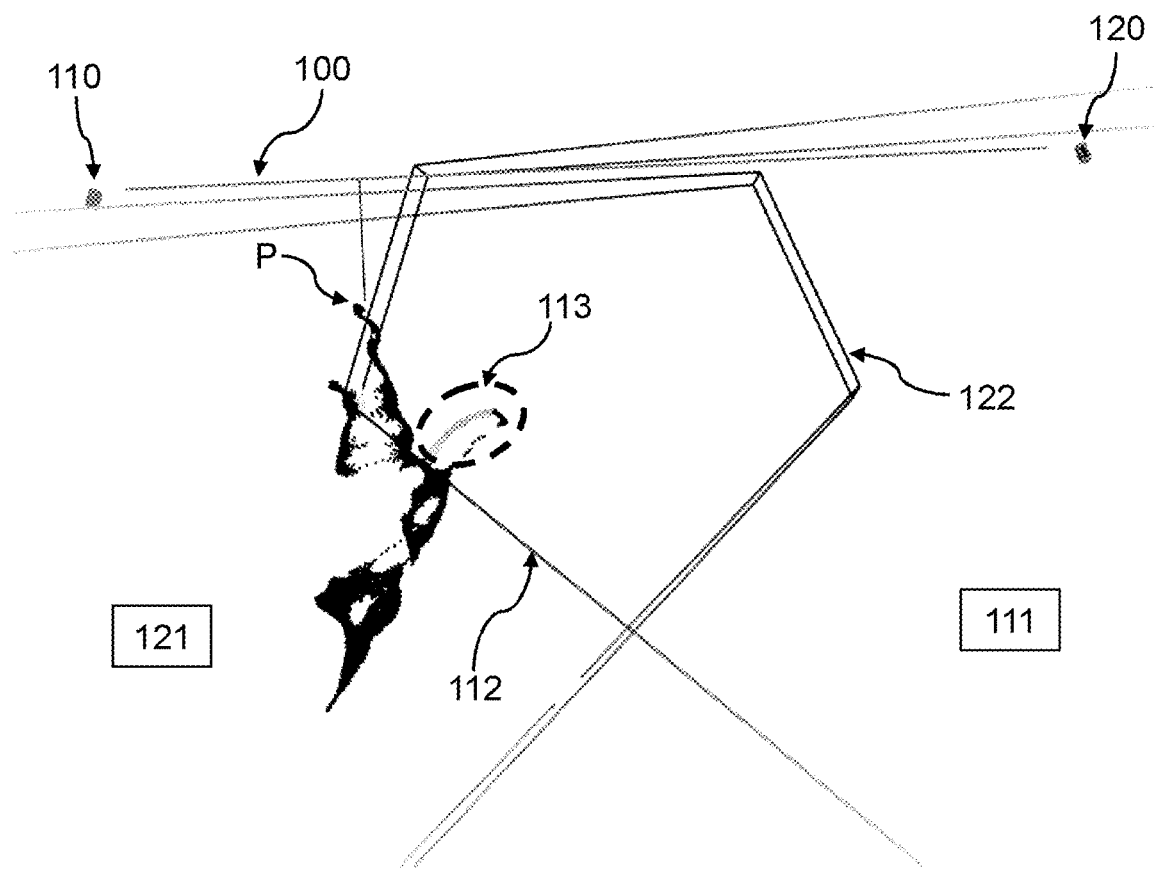
FIG. 10b: A second schematic illustration of performing time-controlled fading according to embodiments of the present invention.
Figure 10C:
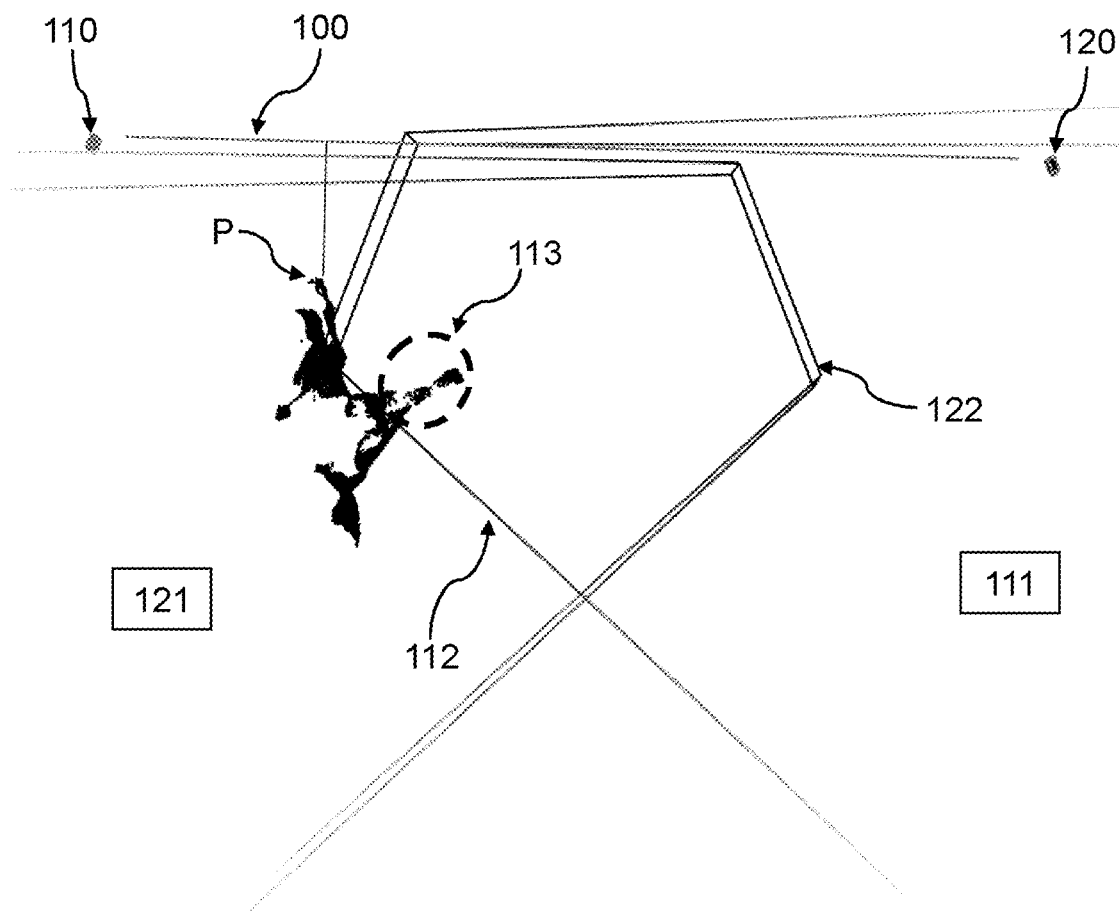
FIG. 10c: A third schematic illustration of performing time-controlled fading according to embodiments of the present invention.

FIGS. 10a, 10b and 10c show a step-by-step sequence of performing time-controlled fading 113 according to embodiments of the present invention, starting with FIG. 10a, continuing with FIG. 10b and ending with FIG. 10c.

Shown in all three figures are the first depth camera 110, the second depth camera 120, and the electronic display 100. Further, the first spatial input area 111 of the first depth camera 110 and the second spatial input area 121 of the second depth camera 120 are each shown as a frustrum of a pyramid. The first spatial input area 111 has a first spatial boundary 112, and the second spatial input area 121 has a second spatial boundary 122.

Furthermore, a set of 3D-points 210 corresponding to an input object 200 is shown. In this case, the input object 200 is a user's hand. The set of 3D-points 210 consists of a first subset of 3D-points 211, which are shown in gray, and a second subset of 3D-points 212, which are shown in black. The first subset of 3D-points 211 corresponds to the 3D-points captured by the first depth camera 110. Accordingly, the first depth camera 110 is also shown in gray.

Likewise, the second subset of 3D-points 212 corresponds to the 3D-points captured by the second depth camera 120. The second depth camera 120 is accordingly also shown in black. These reference signs have been omitted from the illustrations of FIGS. 10a, 10b and 10c for reasons of available space and can be taken analogously from FIG. 8a, for example.

In all three FIGS. 10a, 10b and 10c, the tip of the index finger of the user's hand representing the defining of touchless control pointer P of the input object 200 is outside the first spatial boundary 112. Accordingly, a time-controlled fading out of the first subset of 3D-points 211 or the first depth camera 110 is performed. The time period in which the fade-out is performed is predetermined to 3 seconds in this example. FIG. 10a shows the situation after 1 second. FIG. 10b shows the situation after 2 seconds. FIG. 10c shows the situation after 3 seconds. In the following, time-controlled fading 113 is explained at the dashed marked location in FIGS. 10a, 10b, and 10c. The dashed marked location corresponds to a portion of a thumb of a user. It may be noted here for the sake of completeness that other parts of the hand, particularly in the first subset of 3D-points 211 are not shown, as these are already faded out by another fading-out mechanism which is not a subject of the present invention.

In the situation of FIG. 10a, the touchless control pointer P has crossed the first spatial boundary 112 for 1 second and thus triggered the time controlled fading 113. The first subset of 3D-points 211, which corresponds to the dashed part of the thumb of the user's hand, is now successively faded out. As described above, the first subset of 3D-points 211 is shown in gray, like the corresponding first depth camera 110.

In the situation of FIG. 10b, the time-controlled fading 113 is more advanced and has been performed for 2 seconds. This can be seen from the fact that the first subset of 3D-points 211 has become paler.

In the situation of FIG. 10c, the time-controlled fading is completed because the entire time period for fading of 3 seconds has expired. Accordingly, no more 3D-points of first subset of 3D-points 211 are visible.

As described above, fading out or fading in may be performed in the same manner and is performed in a time-controlled manner in order to facilitate a smooth user experience and prevent undesired discontinuities and/or errors. Every time the touchless control pointer P crosses a spatial boundary 112, 122, i.e. moving out or in a respective spatial input area 111, 121, time-controlled fading 113 is performed. The fading encompasses all 3D-points of a respective subset of 3D-points 211, 212, i.e. all 3D-points which are captured by a respective depth camera 110, 120. In other words, it can be said that one entire depth camera 110,, 120 is faded out or faded in. By that, the risk of the occurrence of discontinuities and/or errors is reduced significantly compared with partial fading of a respective subset of 3D-points 211, 212 or fading of single 3D-points.

Time-controlled fading 113 may in particular be performed by weighting of the 3D-points, wherein a weight may be assigned to each 3D-point of a subset of 3D-points 211, 212 to be faded out or faded in. By assigning weights to the 3D-points fading out and fading in of 3D-points may be implemented efficiently. A weight of a 3D-point can be understood as the valence of a point relative to the other points. Assigning weights to the 3D-points allows partial fading out and/or fading in of 3D-points. The weights may be taken into account when determining the position and/or shape of the input object, i.e. for determining the position of the touchless control pointer. The weights may therefore be the tool for stabilizing and smoothening the detected position of the input object, i.e. of the touchless control pointer.

The weighting may be performed based on a weighting function, the weighting function preferably having a range from 0 to 1 and being suitable for assigning individual weights to each 3D-point. In the example of FIGS. 10a, 10b and 10c showing a fading out of the first subset of 3D-points 211), the weight or the respective 3D-points id decreased linearly within the time period for time-controlled fading 113. In this example the time period is set to 3 seconds, although in various tests a period of 2 seconds as predetermined period of time has proven to be particularly advantageous with respect to the user experience.

Figure 11:
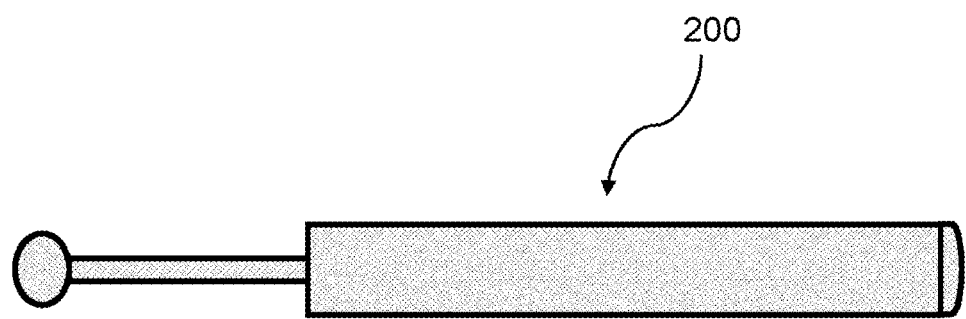
FIG. 11: A schematic illustration of an alternative input object according to embodiments of the present invention.

FIG. 11 shows an example of an input object 200 being a dedicated input device having approximately the shape of a pen.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, such as a processor, a microprocessor, a programmable computer or an electronic circuit. Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments of the invention provide a data carrier having electronically readable control signals, which are capable of cooperating with a programmable computer system, such that one of the methods described herein is performed.

Generally, embodiments of the invention can be implemented as a computer program (product) with a program code, the program code being operative for performing one of the methods when the computer program product runs on a computer. The program code may, for example, be stored on a machine-readable carrier. Other embodiments comprise the computer program for performing one of the methods described herein, stored on a machine-readable carrier. In other words, an embodiment of the present invention is, therefore, a computer program having a program code for performing one of the methods described herein, when the computer program runs on a computer.

A further embodiment of the invention provides a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention provides a data stream or a sequence of signals representing the computer program for performing one of the methods described herein. The data stream or the sequence of signals may, for example, be configured to be transferred via a data communication connection, for example, via the internet.

A further embodiment of the invention provides a processing means, for example, a computer or a programmable logic device, configured to, or adapted to, perform one of the methods described herein.

A further embodiment of the invention provides a computer having installed thereon the computer program for performing one of the methods described herein.

A further embodiment of the invention provides an apparatus or a system configured to transfer (e.g., electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

REFERENCE SIGNS 100 electronic display
110 first depth camera
111 first spatial input area
112 first spatial boundary
120 second depth camera
12 second spatial input area
122 second spatial boundary
113 time-controlled fading
200 input object
210 set of 3D-points
211 first subset of 3D-points
212 second subset of 3D-points
300 interaction area
P touchless control pointer
C cursor

The invention claimed is:

1. A computer-implemented touchless user-interface control method for an electronic display, comprising:
   defining a first spatial input area associated with a first depth camera for the recognition of touchless input, the first spatial input area having a first spatial boundary;
   defining a second spatial input area associated with a second depth camera for the recognition of touchless input, the second spatial input area having a second spatial boundary;
   detecting, using the first and the second depth camera, an input object and determining a set of 3D-points corresponding to the input object;
   wherein the set of 3D-points includes a first subset of 3D-points which is based on data captured by the first depth camera, and a second subset of 3D-points which is based on data captured by the second depth camera;
   determining a touchless control pointer based on the positions of the 3D-points;
   performing time-controlled fading wherein one or both of the subsets of 3D-points is faded out or faded in within a period of time depending on successive positions of the touchless control pointer relative to the first and second spatial boundaries,
      wherein time-controlled fading includes at least one of:
      if the touchless control pointer moves from inside to outside the first spatial input area crossing the first spatial boundary, the first subset of 3D-points is faded out within a period of time, and/or
      if the touchless control pointer moves from inside to outside the second spatial input area crossing the second spatial boundary, the second subset of 3D-points is faded out within a period of time, and/or if the touchless control pointer moves from outside to inside the first spatial input area crossing the first spatial boundary, the first subset of 3D-points is faded in within a period of time, or and/or if the touchless control pointer moves from outside to inside the second spatial input area crossing the second spatial boundary, the second subset of 3D-points is faded in within a period of time.

2. The computer-implemented method of claim 1, wherein each of the spatial input areas are distanced in a respective observation direction from the respective depth camera.

3. The computer-implemented method of claim 2, wherein the first spatial boundary is arranged at a predetermined part of the first spatial input area, and wherein the second spatial boundary is arranged at a predetermined part of the second spatial input area.

4. The computer-implemented method of claim 1, wherein the first spatial boundary is arranged facing towards the first depth camera, and wherein the second spatial boundary is arranged facing towards the second depth camera.

5. The computer-implemented method of claim 1, the method comprising weighting of the 3D-points of the first and/or second subset of 3D-points, wherein weights are assigned to the 3D-points.

6. The computer-implemented method of claim 5, wherein weighting is performed based on a weighting function, the weighting function being suitable for assigning weights to each 3D-point and/or to a subset of 3D-points.

7. The computer-implemented method of claim 5, wherein time-controlled fading is performed using the weighting, wherein for fading out 3D-points the respective weights are reduced from 1 to 0 within a period of time.

8. The computer-implemented method of claim 7, wherein the weighting function is a linear function providing continuous time-controlled fading, wherein the period of time is preferably approximately 2 seconds.

9. The computer-implemented method of claim 1, wherein if one subset of 3D-points is faded out, determining the touchless control pointer is performed solely based on the remaining subset(s) of 3D-points not being faded out.

10. The computer-implemented method of claim 1, wherein if one subset of 3D-points is faded out, the respective depth camera is deactivated.

11. The computer-implemented method of claim 1, wherein the period of time is adjustable.

12. The method of claim 1, comprising outputting a signal upon performing time-controlled fading, preferably a visual signal displayed on the electronic display and/or an acoustic signal.

13. A data processing apparatus, preferably an electronic display, comprising;
a processor; and
a storage medium,
wherein the storage medium stores a computer program, the computer program comprising instructions which, when the computer program is executed by the processor, causes the processor to steps of touch interface control comprising:
defining a first spatial input area associated with a first depth camera for the recognition of touchless input, the first spatial input area having a first spatial boundary;

defining a second spatial input area associated with a second depth camera for the recognition of touchless input, the second spatial input area having a second spatial boundary;

detecting, using the first and the second depth camera, an input object and determining a set of 3D-points corresponding to the input object;

wherein the set of 3D-points includes a first subset of 3D-points which is based on data captured by the first depth camera, and a second subset of 3D-points which is based on data captured by the second depth camera;

determining a touchless control pointer based on the positions of the 3D-points;

performing time-controlled fading wherein one or both of the subsets of 3D-points is faded out or faded in within a period of time depending on successive positions of the touchless control pointer relative to the first and second spatial boundaries, wherein time-controlled fading includes at least one of;
if the touchless control pointer moves from inside to outside the first spatial input area crossing the first spatial boundary, the first subset of 3D-points is faded out with in a period of time,
if the touchless control pointer moves from inside to outside the second spatial input area crossing the second spatial boundary, the second subset of 3D-points is faded out within a period of time,
if the touchless control pointer moves from outside to inside the first spatial input area crossing the first spatial boundary, the first subset of 3D-points is faded in within a period of time, or
if the touchless control pointer moves from outside to inside the second spatial input area crossing the second spatial boundary, the second subset of 3D-points is faded in within a period of time.

14. A computer program comprising instructions which, when the program is executed by a computer, cause the computer to carry out a touchless user-interface control method for an electronic display, comprising:
defining a first spatial input area associated with a first depth camera for the recognition of touchless input, the first spatial input area having a first spatial boundary;
defining a second spatial input area associated with a second depth camera for the recognition of touchless input, the second spatial input area having a second spatial boundary;
detecting, using the first and the second depth camera, an input object and determining a set of 3D-points corresponding to the input object;
wherein the set of 3D-points includes a first subset of 3D-points which is based on data captured by the first depth camera, and a second subset of 3D-points which is based on data captured by the second depth camera;
determining a touchless control pointer based on the positions of the 3D-points ;
performing time-controlled fading wherein one or both of the subsets of 3D-points is faded out or faded in within a period of time depending on successive positions of the touchless control pointer relative to the first and second spatial boundaries,
wherein time-controlled fading includes at least one of:
if the touchless control pointer moves from inside to outside the first spatial input area crossing the first spatial boundary, the first subset of 3D-points is faded out within a period of time, if the touchless control pointer moves from inside to outside the second spatial input area crossing the second spatial boundary, the second subset of 3D-points is faded out within a period of time, and/or
if the touchless control pointer moves from outside to inside the first spatial input area crossing the first spatial boundary, the first subset of 3D-points is faded in within a period of time, or
if the touchless control pointer moves from outside to inside the second spatial input area crossing the second spatial boundary, the second subset of 3D-points is faded in within a period of time.

\* \* \* \* \*